| United States Patent [19] | [11] Patent Number: 4,565,851 |
| Barbee | [45] Date of Patent: Jan. 21, 1986 |

[54] CONTAINERS HAVING IMPROVED GAS BARRIER PROPERTIES

[75] Inventor: Robert B. Barbee, Kingsport, Tenn.

[73] Assignee: Eastman Kodak Company, Rochester, N.Y.

[21] Appl. No.: 488,295

[22] Filed: Apr. 25, 1983

[51] Int. Cl.$^4$ .................. C08L 67/02; C08L 67/04
[52] U.S. Cl. ................... 525/437; 525/411; 525/450
[58] Field of Search .............. 525/437, 450, 411

[56] References Cited

U.S. PATENT DOCUMENTS

| 3,835,089 | 9/1974 | Fox | 525/411 |
| 3,890,283 | 6/1975 | Casey | 525/450 |
| 3,892,821 | 7/1975 | Koleske | 525/411 |
| 4,137,921 | 2/1979 | Okuzumi | 525/411 |

*Primary Examiner*—John C. Bleutge
*Assistant Examiner*—Patricia Short
*Attorney, Agent, or Firm*—Clyde L. Tootle; David E. Cotey; Daniel B. Reece, III

[57] ABSTRACT

The present invention provides polymer blend compositions which are useful in the formation of containers having improved resistance to gas permeability. The polymer blend compositions comprise about 5 to 50 percent by weight of a first polyester comprising polyglycolic acid and correspondingly about 50 to 95 percent by weight of a second polyester. The second polyester comprises units derived from a diacid component comprising terephthalic acid and units derived from a diol component which preferably comprises ethylene glycol. The containers which are provided by the present invention may be in the form of sheet, film, molded articles, such as bottles, and other such structures.

9 Claims, No Drawings

CONTAINERS HAVING IMPROVED GAS BARRIER PROPERTIES

BACKGROUND OF THE INVENTION

The present invention relates to packages for protecting comestibles and to the materials from which such packages are made.

Presently there is a strong interest in the packaging industry for protecting comestibles, such as foodstuffs, medicines, and the like, by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While containers formed from polyethylene terephthalate have many desirable characteristics, there is a need in the art to provide improved containers which will have gas permeabilities which are lower than those of containers formed from polyethylene terephthalate. Such improved containers would be much more versatile in their utilization and allow the containers to be used to package substances for which the polyethylene terephthalate containers may not be suitable.

The present invention provides a novel polymer blend which is suitable for use in forming packages for protecting comestibles. The present invention also provides improved containers made of the polymer blend which exhibit improved resistance to gas permeability.

SUMMARY OF THE INVENTION

In one aspect of the present invention, there is provided a novel polymer blend which comprises about 5 to 50 percent by weight of a first polyester comprising polyglycolic acid and correspondingly about 50 to 95 percent by weight of a second polyester. The second polyester comprises units derived from a diacid component comprising terephthalic acid and units derived from a diol component which comprises at least one diol containing up to about 8 carbon atoms.

In another aspect, the present invention provides containers having improved resistance to gas permeability. The containers are formed from the novel polymer blend of the present invention.

DETAILED DESCRIPTION OF THE INVENTION

The invention described herein relates to a novel polymer blend and to containers formed therefrom. As used herein, the term "container" is intended to mean shaped articles formed from the specified polymer blend which are suitable for use in packaging comestibles. Such shaped articles include sheets and films which are extruded from the blend and which may be used as such or as barrier layers, container liners, as components of laminates or other composites, etc. Such shaped articles also include molded containers, such as bottles.

The polymer blend of the present invention comprises a first polyester component comprising polyglycolic acid and a second polyester component.

Polyglycolic acid is a known polymeric material which has been described in the literature. Polyglycolic acid can be prepared, for example, by the ring-opening polymerization of glycolide using stannous octoate catalyst. This preparation has been described by D. K. Gilding and A. M. Reed in *Polymer*, Vol. 20, p. 1459 (1979). The polyglycolic acid compositions which are useful in the blend of the present invention exhibit inherent viscosities of about 0.3 to 1.5, as determined as a 0.5 percent solution in hexafluoroisopropanol at 25° C.

The second polyester comprises units derived from a diacid component and units derived from a diol component. The diacid component comprises terephthalic acid. Other well-known polyester-forming diacids may be employed in minor amounts (i.e., less than about 50 mole percent, and, preferably, less than about 10 mole percent, based on the total amount of diacid present in the polyester). Such diacids may include for example, isophthalic acid, 1,4-cyclohexanedicarboxylic acid, linear lower alkyl dicarboxylic acids, etc. The diacid component may also include acid halides and esters, particularly the lower alkyl ($C_1$–$C_4$) esters of the acids mentioned.

The diol component of the second polyester comprises one or more diols containing up to about 8 carbon atoms. Examples of such diols include ethylene glycol; 1,4-butanediol; 1,4-cyclohexanedimethanol; propylene glycol; diethylene glycol; 2,2,4-trimethyl-1,3-pentanediol; 2,2-dimethyl-1,3-propanediol; 2,2-diethyl-1,3-propanediol; 2-methyl-2-propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc. The diol component is preferably selected from ethylene glycol, 1,4-butanediol, and 1,4-cyclohexanedimethanol, and is more preferably selected from ethylene glycol and 1,4-butanediol. Most preferably, the diol component comprises ethylene glycol. Additionally, minor amounts (i.e., less than about 50 mole percent, and, preferably, less than about 10 mole percent, based on the total amount of diol present in the polyester) of other known polyester-forming diols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; and other well known polyester-forming diols.

The second polyester which is employed in the present invention exhibits an I.V. of about 0.5 to 1.5. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the blend of the present invention.

The second polyester employed in the blend of the present invention is synthesized by methods generally known in the art for producing polyesters. The reactants may all be reacted in a single operation or, alternatively, sequential operation may be employed. Temperatures which are suitable for forming the polyester generally range between about 180° C. and about 295° C., with the preferred range being about 200° to 285° C. The reaction may be conducted under an inert atmosphere, such as nitrogen. Preferably, the latter stage of the reaction is conducted under a vacuum.

Conventional catalysts are employed in the preparation of the second polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{-3}$ moles of catalyst per mole of total acid employed.

The blend of the present invention comprises about 5 to 50 percent by weight of polyglycolic acid and correspondingly about 50 to 95 percent by weight of the second polyester component. When the blend of the present invention is to be formed into a sheet or film, the blend preferably comprises about 25 to 50 percent by weight of polyglycolic acid and correspondingly about 50 to 75 percent by weight of the second polyester. When a molded container, such as a bottle, is desired, the polymer blend preferably comprises about 5 to 30 percent by weight of polyglycolic acid and correspondingly about 70 to 95 percent by weight of the second polyester.

Of course, suitable additives, such as dyes, pigments, plasticizers, fillers, antioxidants, stabilizers, etc., may be employed in the blend of the present invention in conventional amounts.

The blend of the present invention can be prepared by any of numerous techniques known in the art for preparing polymer blends. For example, in preparing the blend of the present invention, the individual components are commonly provided in the form of granules, chips, or pellets. Preferably, the solid particles of each component are of approximately equivalent sizes. If necessary, the particles of one or both components can be pre-processed (e.g., by grinding or otherwise) in order to achieve a desired particle size. Each of the components is then weighed separately, and the components are then physically mixed together in any appropriate apparatus. After the mixture of solid polymer particles has been prepared, the polymer blend can then be formed. Convenient methods of forming the polymer blend include melt extrusion, injection molding, etc. The apparatus employed in such processes thoroughly mixes the polymers in the melt and then processes the blends so as to form sheet, film, molded containers, or other desired structures.

Film or sheet material made from the blend of the present invention is strong and flexible. It may be formed into articles such as wrappers, bags, and the like.

Molded containers can be made from the above-described blend compositions by compression molding, blow molding, and other such molding techniques, all of which are well known in the art. Preferred molded containers are biaxially oriented blow-molded containers.

The above-described containers of the present invention are ideally suited for protecting comestibles, such as foodstuffs, medicines, and like substances. The advantages of these containers are due to low gas permeability relative to polyethylene terephthalate. Because of the decreased gas transmission rates of these polymer blends, they perform well in packaging applications where improved gas barrier properties are required. Typically, oriented films formed from the blend of the present invention exhibit an oxygen permeability of less than about 5 (preferably, less than about 4), measured as cubic centimeters permeating a 1 mil thick sample, 100 inches square, for a 24-hour period under a partial pressure difference of 1 atmosphere at 30° C.

This invention will be further illustrated by the following Example, although it will be understood that this Example is included merely for purposes of illustration and is not intended to limit the scope of the invention.

EXAMPLE

This Example illustrates the improved gas barrier properties of containers formed from blends of polyglycolic acid and polyethylene terephthalate.

Physical mixtures of polyglycolic acid and polyethylene terephthalate comprising 0, 10, 25, and 50 weight percent polyglycolic acid were prepared. Solid particles of each component in the amounts indicated were dry blended by tumbling. The blends were then compounded by melt extruding the blend compositions at 240°–260° C. into amorphous 5–10 mil films by using a Brabender extruder. The oxygen permeability of each film was determined in cubic centimeters permeating a 1 mil thick sample, 10 inches square, for a 24-hour period under an oxygen partial pressure difference of one atmosphere at 30° C. using a MOCON Oxtran 100 instrument. While the film actually used to measure permeability was 5 to 10 mils in thickness, the permeability was converted to a 1 mil basis using conventional calculations. The results are given in Table I.

The films were then biaxially oriented 300% at 90° C. on a T. M. Long machine, and the oxygen permeabilities of the oriented films were measured as described above. The results are given in Table I.

TABLE I

| Composition (Wt. % Polyglycolic Acid) | Oxygen Permeability | |
|---|---|---|
| | Unoriented | Oriented |
| 0 | 10.9 | 6.3 |
| 10 | 8.7 | 3.8 |
| 25 | 7.0 | 1.0 |
| 50 | 0.8 | — |

It can be seen from a review of the data of Table I that films formed from the blends of the present invention provide improved gas barrier properties over films formed from polyethylene terephthalate alone. These superior properties render the blend compositions of the present invention extremely advantageous for use in the formation of containers.

While the invention has been described in detail with particular reference to preferred embodiments thereof, it will be understood that variations and modifications can be effected within the spirit and scope of the invention.

I claim:

1. A polymer blend comprising about 5 to 50 percent by weight of a first polyester comprising polyglycolic acid and correspondingly about 50 to 95 percent by weight of a second polyester comprising units derived from a diacid component comprising terephthalic acid and units derived from a diol component which comprises at least one diol containing up to about 8 carbon atoms.

2. The polymer blend of claim 1 wherein said diol component is selected from ethylene glycol, 1,4-cyclohexylenedimethanol, butylene glycol, and mixtures thereof.

3. The polymer blend of claim 2 wherein said diol component comprises ethylene glycol.

4. The polymer blend of claim 1 wherein said second polyester comprises polyethylene terephthalate.

5. A polymer blend according to claim 1 wherein said polymer blend comprises about 25 to 50 percent by weight of polyglycolic acid and correspondingly about 50 to 75 percent by weight of said second polyester.

6. A polymer blend according to claim 1 wherein said polymer blend comprises about 5 to 30 percent by weight of polyglycolic acid and correspondingly about 70 to 95 percent by weight of said second polyester.

7. A container formed from the polymer blend of claim 1.

8. A film formed from the polymer blend of claim 5.

9. A molded container formed from the polymer blend of claim 6.

* * * * *